(12) United States Patent
Sawafta et al.

(10) Patent No.: US 11,519,171 B2
(45) Date of Patent: Dec. 6, 2022

(54) COMPOSITE CONSTRUCTION PANELS AND APPLICATIONS THEREOF

(71) Applicant: Phase Change Energy Solutions, Inc., Asheboro, NC (US)

(72) Inventors: Reyad I. Sawafta, Greensboro, NC (US); Ken Farrish, Asheboro, NC (US); Byron C. Owens, Asheboro, NC (US); Peter F. Horwath, Randleman, NC (US); James D. Thornsberry, Asheboro, NC (US)

(73) Assignee: Phase Change Energy Solutions, Inc., Asheboro, NC (US)

( * ) Notice: Subject to any disclaimer, the term of this patent is extended or adjusted under 35 U.S.C. 154(b) by 0 days.

(21) Appl. No.: 17/317,496

(22) Filed: May 11, 2021

(65) Prior Publication Data

US 2021/0262228 A1 Aug. 26, 2021

Related U.S. Application Data

(63) Continuation of application No. 16/264,302, filed on Jan. 31, 2019, now abandoned, which is a
(Continued)

(51) Int. Cl.
*F28D 20/02* (2006.01)
*B32B 3/08* (2006.01)
(Continued)

(52) U.S. Cl.
CPC .............. *E04C 2/292* (2013.01); *A62C 35/10* (2013.01); *B32B 3/08* (2013.01); *B32B 3/085* (2013.01); *E04B 1/80* (2013.01); *E04C 2/08* (2013.01); *E04C 2/205* (2013.01); *E04C 2/34* (2013.01); *E04C 2/521* (2013.01); *E04C 2/523* (2013.01);
(Continued)

(58) Field of Classification Search
CPC . E04C 2/292; E04C 2/08; E04C 2/205; E04C 2/34; E04C 2/521; E04C 2/523; A62C 35/10; A62C 2/065; B32B 3/08; B32B 3/085; E04B 1/80; E04B 9/001; E04B 9/045; E04B 9/0457; F28D 20/02; F28D 20/023; F28D 20/026; Y02E 60/14; Y10T 428/24; Y10T 428/24066; Y10T 428/24744; Y10T 428/24942; Y10T 428/249953; Y10T 428/31547; Y10T 428/31551; Y10T 428/31678
See application file for complete search history.

(56) References Cited

U.S. PATENT DOCUMENTS 5,770,295 A * 6/1998 Alderman ............... F24S 20/61
428/68
2003/0129330 A1* 7/2003 Alderman ............ B29C 66/4312
428/34.1
(Continued)

*Primary Examiner* — Cynthia L Schaller
(74) *Attorney, Agent, or Firm* — Nexsen Pruet, PLLC; E. Eric Mills; Bryan L. Baysinger

(57) ABSTRACT

In one aspect, composite construction materials are described herein. In some embodiments, a composite construction panel comprises a substrate layer, a cover layer separated from the substrate layer by one or more spacers, and at least one mat disposed between the substrate layer and the cover layer, wherein the mat comprises at least one phase change material disposed in at least one phase change region.

15 Claims, 14 Drawing Sheets

Related U.S. Application Data continuation of application No. 14/344,808, filed as application No. PCT/US2012/055500 on Sep. 14, 2012, now abandoned.

(60) Provisional application No. 61/535,932, filed on Sep. 16, 2011.

(51) Int. Cl.

| | | |
|---|---|---|
| *E04C 2/34* | (2006.01) | |
| *E04C 2/292* | (2006.01) | |
| *E04B 1/80* | (2006.01) | |
| *A62C 35/10* | (2006.01) | |
| *E04C 2/52* | (2006.01) | |
| *E04C 2/08* | (2006.01) | |
| *E04C 2/20* | (2006.01) | |
| *A62C 2/06* | (2006.01) | |
| *E04B 9/04* | (2006.01) | |
| *E04B 9/00* | (2006.01) | |

(52) U.S. Cl.
CPC ........... *F28D 20/02* (2013.01); *F28D 20/023* (2013.01); *F28D 20/026* (2013.01); *A62C 2/065* (2013.01); *E04B 9/001* (2013.01); *E04B 9/045* (2013.01); *E04B 9/0457* (2013.01); *Y02E 60/14* (2013.01); *Y10T 428/24* (2015.01); *Y10T 428/24066* (2015.01); *Y10T 428/24744* (2015.01); *Y10T 428/24942* (2015.01); *Y10T 428/249953* (2015.04); *Y10T 428/31547* (2015.04); *Y10T 428/31551* (2015.04); *Y10T 428/31678* (2015.04)

(56) References Cited

U.S. PATENT DOCUMENTS

| | | | |
|---|---|---|---|
| 2010/0088970 A1* | 4/2010 | Miller | H02S 20/23 52/1 |
| 2010/0127000 A1* | 5/2010 | Horwath | F28D 20/02 220/592.01 |
| 2011/0120040 A1* | 5/2011 | Alderman | E04B 9/001 52/309.13 |

\* cited by examiner

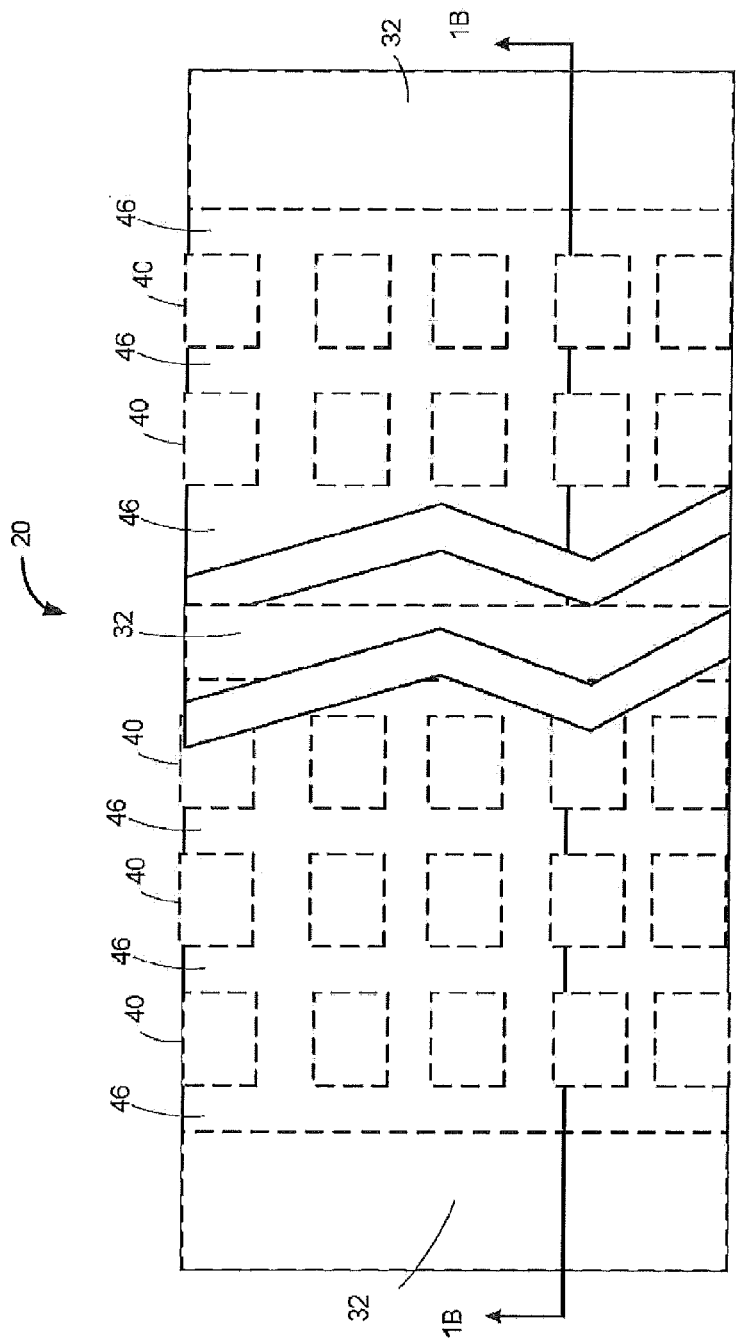

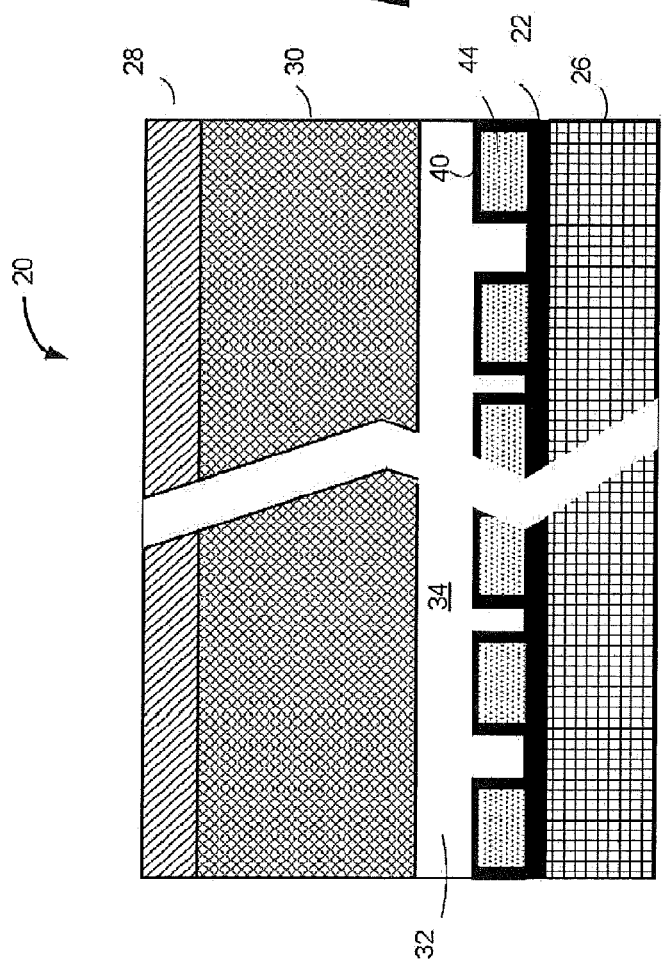

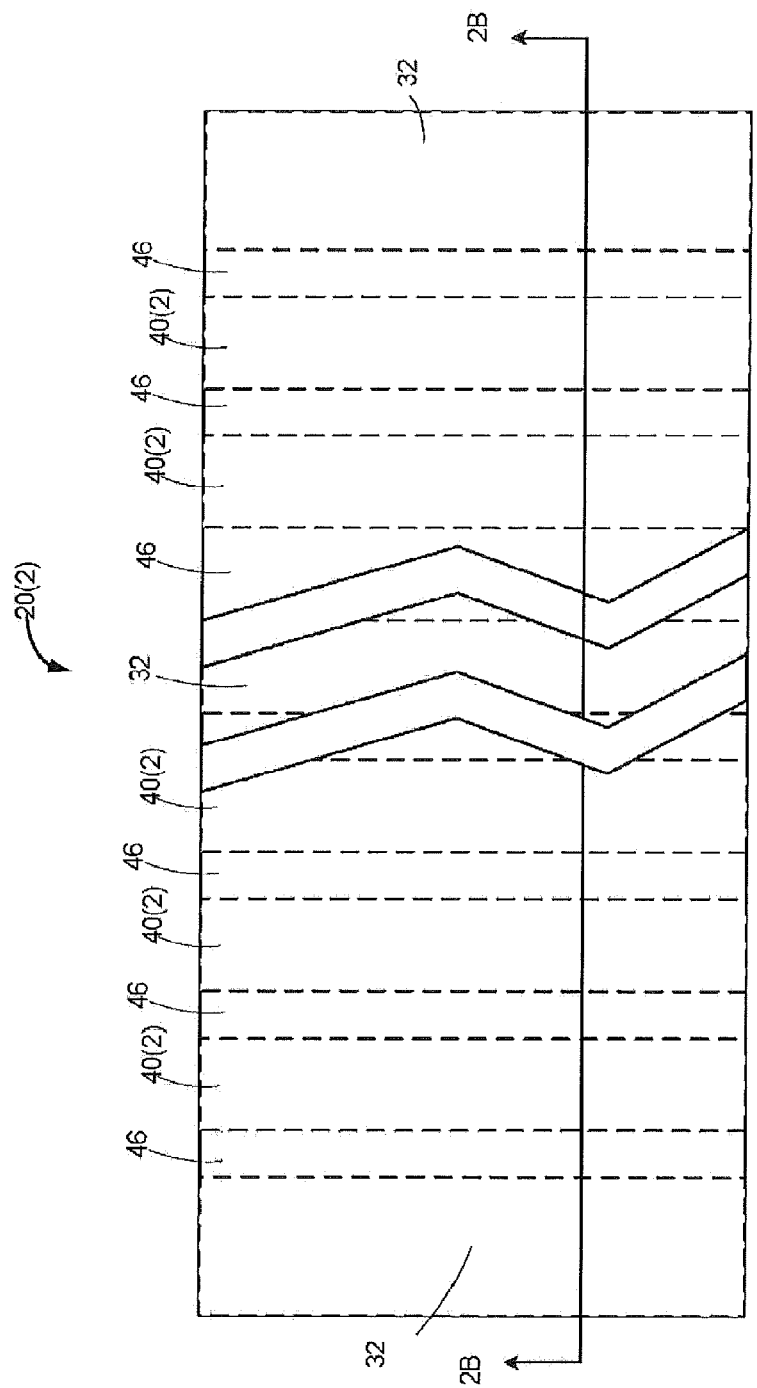

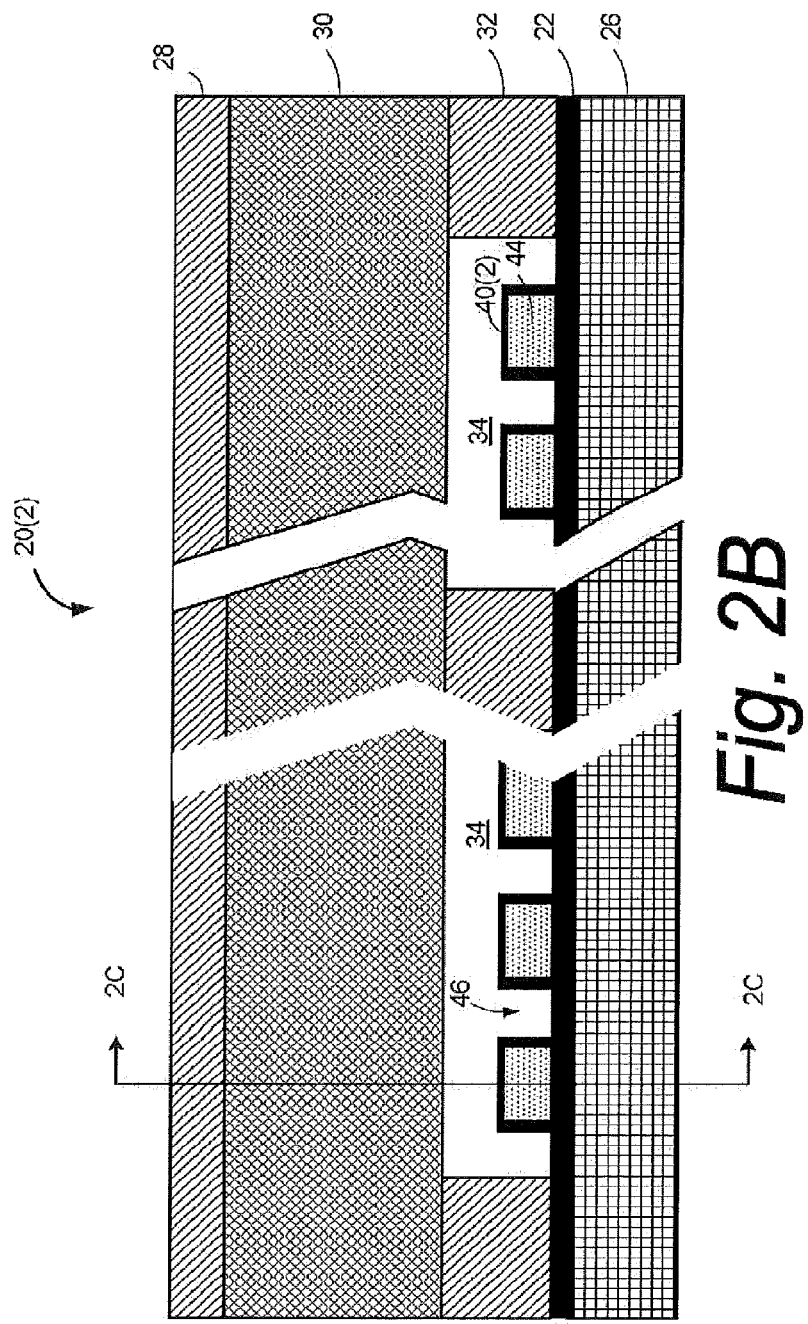

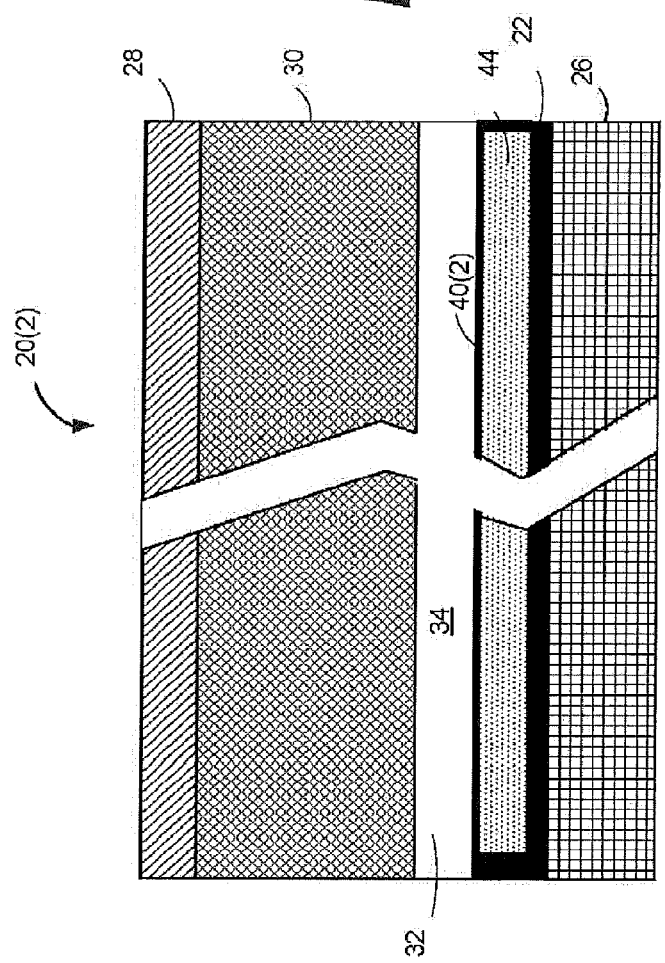

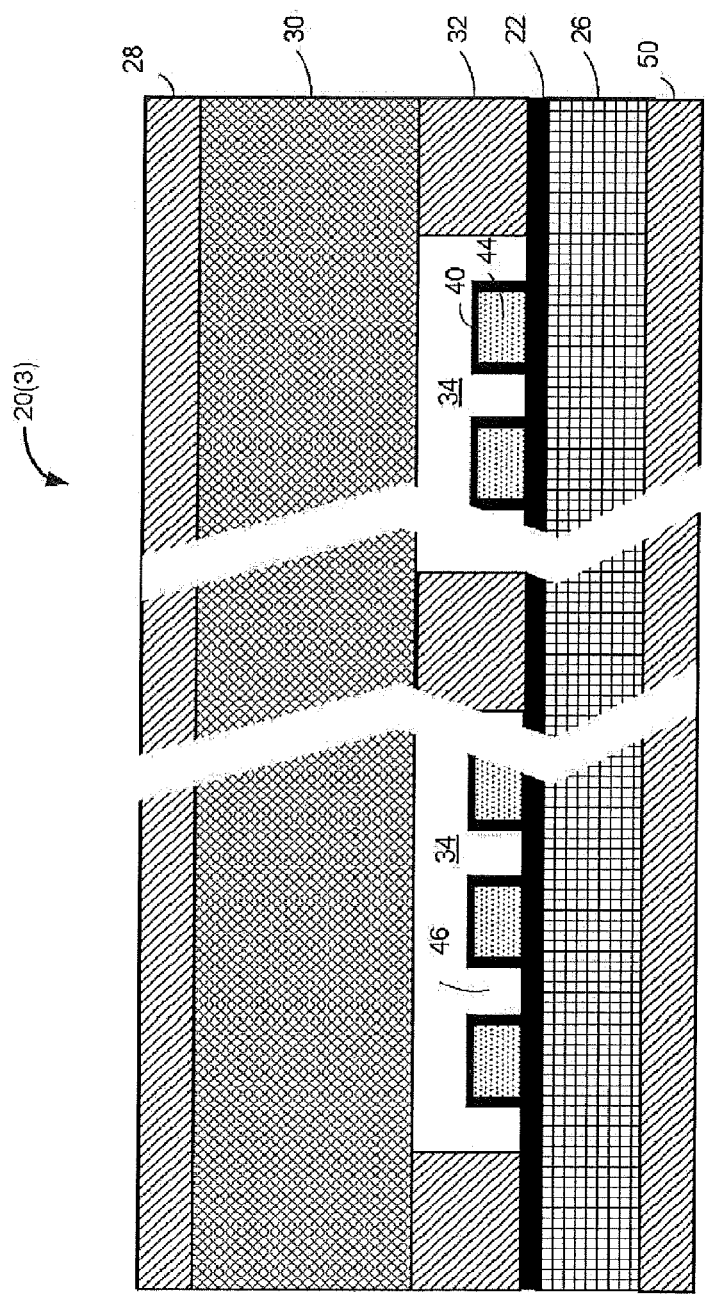

COMPOSITE CONSTRUCTION PANELS AND APPLICATIONS THEREOF

CROSS REFERENCE TO RELATED APPLICATIONS

This application is a continuation of U.S. patent application Ser. No. 16/264,302, filed Jan. 31, 2019, which is a continuation of U.S. patent application Ser. No. 14/344,808, filed Oct. 9, 2014, which is the national stage application under 35 U.S.C. § 371 of International Application No. PCT/US2012/055500, filed Sep. 14, 2012, which claims priority pursuant to 35 U.S.C. § 119(e) to U.S. Provisional Patent Application Ser. No. 61/535,932, filed on Sep. 16, 2011, each of which is hereby incorporated by reference in its entirety.

FIELD

The present invention relates to composite construction panels and, in particular, to composite construction panels comprising a phase change material (PCM).

BACKGROUND

In recent years latent heat storage has become increasingly important in a wide array of technologies. Latent heat includes thermal energy released or absorbed during a change of state of a material without a substantial change in the temperature of the material. The change of state can include a phase change such as a solid-liquid, solid-gas, liquid-gas, or solid-solid phase change.

Due to their latent heat storage properties, phase change materials (PCMs) have found application in a wide array of thermal energy technologies. However, the use of PCMs in building and construction applications has been somewhat limited by disadvantages associated with the phase transitions of some PCMs. Improved building and construction materials including PCMs are desired.

SUMMARY

In one aspect, composite construction panels are described herein which, in some embodiments, may provide one or more advantages over prior construction panels. For example, in some embodiments, a composite construction panel described herein can be used as an underlayment for a roofing membrane to lower the average surface temperature and extend the useful lifetime of the membrane. In other embodiments, a composite construction panel described herein can be used as an underlayment for one or more solar panels, thus extending the useful lifetime of the solar panels and helping the solar panels maintain higher efficiency by operating at lower average temperatures. Composite construction panels described herein, in some embodiments, can also be used to construct ceilings, walls, and/or roofs. Moreover, in some embodiments, a composite construction panel described herein can help extinguish or prevent fires.

In some embodiments, a composite construction panel described herein comprises a substrate layer, a cover layer over the substrate layer and separated from the substrate layer by one or more spacers, and at least one mat disposed between the substrate layer and the cover layer, wherein the mat comprises at least one phase change material disposed in at least one phase change region. A phase change region, in some embodiments, comprises a pouch. Further, in some embodiments, the mat comprises a plurality of phase change regions or pouches comprising a PCM. In such embodiments, the phase change regions or pouches, if desired, can be arranged in an array or grid pattern, such as an array of equidistantly spaced, phase change regions or pouches. Further, in some embodiments, at least one phase change region or pouch protrudes above the mat.

In addition, in some embodiments, the spacers of a composite construction panel described herein define one or more vent spaces between the substrate layer and the cover layer of the panel. Moreover, in some embodiments, cross vent channels are provided in the vent spaces between adjacent phase change regions or pouches.

In some embodiments, a composite construction panel described herein comprises a plurality of mats disposed between the substrate layer and the cover layer, wherein the mats are vertically separated from one another in a stacked configuration by one or more spacers and comprise at least one PCM disposed in at least one phase change region or pouch. In some embodiments, the plurality of mats comprises a first mat comprising a first PCM disposed in a first phase change region and a second mat comprising a second PCM disposed in a second phase change region, wherein the first and second PCMs are differing PCMs. Differing PCMs, in some embodiments, exhibit differing phase transition temperatures.

Moreover, in some embodiments, a mat of a composite construction panel described herein comprises a plurality of phase change regions arranged in a plurality of rows, wherein a first row comprises a first PCM and a second row comprises a second PCM, the first and second PCMs being differing PCMs. The differing PCMs, in some embodiments, can exhibit differing phase transition temperatures.

Further, in some embodiments of composite construction panels described herein, one or both of the substrate layer and the cover layer of the panel is formed from a foam such as a polyurethane foam. Moreover, in some embodiments comprising a foam substrate or cover layer, a fire retardant or extinguisher is disposed in the foam. In other embodiments, a PCM is disposed in the foam. In some embodiments, one or both of the substrate layer and the cover layer is formed from wood, plywood, particle board, oriented strand board, gypsum board, or metal.

In addition, in some embodiments, a spacer of a composite construction panel is hollow. Further, in some embodiments, a fire retardant or extinguisher is disposed in the interior of the hollow spacer. In other embodiments, a PCM is disposed in the interior of the hollow spacer.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A is a top view of a composite panel according to a first example embodiment; FIG. 1C is a sectioned side view of the composite panel of FIG. 1B taken along line 1C-1C.

FIG. 2A is a top view of a composite panel according to a second example embodiment; FIG. 2B is a sectioned side view of the composite panel of FIG. 2A taken along line 2B-2B; FIG. 2C is a sectioned side view of the composite panel of FIG. 2B taken along line 2C-2C.

FIG. 3 is a sectioned side view of a composite panel according to a third example embodiment.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The technology disclosed herein concerns composite construction panels which incorporate a phase change material (PCM), methods of making the same, and products which utilize or incorporate the same. Such products may include, for example, solar cell units and photovoltaic cell units.

Figure 1B:
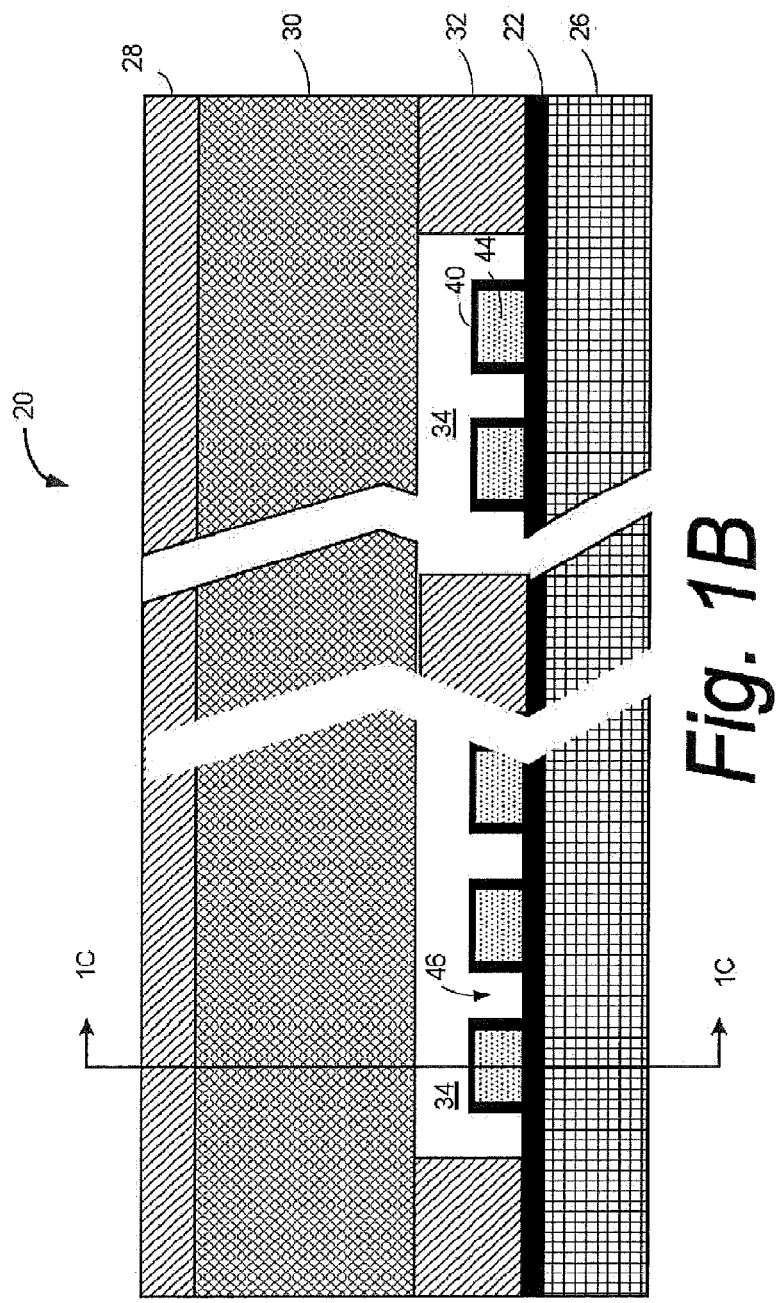
FIG. 1B is a sectioned side view of the composite panel of FIG. 1A taken along line 1B-1B.

FIG. 1A, FIG. 1B, and FIG. 1C illustrate a first example embodiment of a composite construction panel 20 which comprises a mat or panel 22 which includes a phase change material and thus provides phase change properties. For sake of simplicity, such mat or panel comprising a phase change material and providing phase change properties is herein referred to as the "phase change mat". FIG. 1A, FIG. 1B, and FIG. 1C show top, side, and end views, respectively, of the composite construction panel 20 of the first example embodiment.

In the composite construction panel 20 the phase change mat 22 serves as one component layer of the multi-layer composite panel. Other component layers of composite construction panel 20 include substrate layer 26; cover layer 28; and insulation layer 30. In addition, composite construction panel 20 includes two or more spacers 32 which serve to at least partially define or at least partially border one or more vent spaces 34. As explained herein, in differing embodiments the materials comprising substrate layer 26, cover layer 28, insulation layer 30, and spacers 32 can vary, and additional layers can also be added.

In the example embodiment of FIG. 1A, FIG. 1B, and FIG. 1C, as in some other example embodiments described herein, the composite construction panel comprises two end spacers 32 and an intermediate spacer situated approximately equidistant between the two end spacers 32. It should be appreciated that, depending on size of the composite construction panel and structural integrity factors, two, three, or more spacers 32 may be provided. The spacers 32 divide or partition a portion of the interior of the composite construction panel into the vent spaces 34.

In an example embodiment, the phase change mat 22 comprises regions of phase change material, also known as phase change regions 40, and sometimes referred to as "pouches". Preferably the regions are discrete regions which extend or protrude from a plane of the base of phase change mat 22. In the example implementation, phase change regions 40 have an outer cover which may comprise the same materials as does the base of phase change mat 22, with the cover defining a pocket or cavity in which phase change material 44 resides. The phase change material 44 in the phase change regions 40 is thus "encapsulated," and preferably (even in a liquid state) has an extremely high viscosity and would not 'leach out' if fasteners for another board (e.g., a re-roof cover board) were to penetrate the phase change material 44. Description of the phase change material 44 is provided subsequently herein.

In the example embodiment of FIG. 1A, FIG. 1B, and FIG. 1C, as in certain other but not all embodiments hereof, the phase change regions 40 of phase change mat 22 extend or protrude above the plane of the base of phase change mat 22 and thus extend or protrude into the vent spaces 34 of the composite construction panel. In the example embodiment of FIG. 1A, FIG. 1B, and FIG. 1C, such phase change regions 40 have the shape or configuration of essentially square blocks or pouches. FIG. 1A thus illustrates the composite construction panel 20 as comprising one or more arrays of essentially equidistantly spaced, square phase change regions 40. Cross vent channels 46 are provided in vent spaces 34 between adjacent phase change regions 40.

FIG. 1A, like top views of other embodiments, shows the footprint of the composite construction panel. Dimensions of the composite construction panel may vary in different embodiments, so that the footprint dimensions per se are not critical. The footprint dimensions may be four feet width by four feet length, or four feet width by eight feet length, in two example implementations. The footprint dimensions, and thus the internal arrangement (number of phase change regions 40 and spacers 32), may be dependent upon environment or nature of use or application. Other dimensions are also possible. Any dimensions not inconsistent with the objectives of the present invention may be used.

FIG. 1B, like other side views, shows a thickness of the composite construction panel. In example embodiments, a thickness of substrate layer 26 is one inch; a thickness of the spacers 32 is one inch; a thickness of insulation layer 30 is two inches; and a thickness of cover layer 28 is one-half inch. In an example implementation, the spacers 32 have a length of four inches along the side dimension (as shown across the sheet of FIG. 1B). Other dimensions are also possible. Any dimensions not inconsistent with the objectives of the present invention may be used.

In one example embodiment, both substrate layer 26 and insulation layer 30 are insulation layers, the R-value of insulation layer 30 preferably being twice that of substrate layer 26. In other words, the insulation layer (e.g., a foam board) which serves as insulation layer 30 and which covers the vent spaces 34 and phase change mat 22 has twice the R-value as substrate layer 26 (which may be a foam board on the bottom surface of the composite). This 2:1 R-value ratio is believed to represent an optimum heat transfer mechanism, as the higher R-value board on the top will provide the right amount of insulation from the radiant energy of the 'hot side' from reaching the phase change materials, whereas the lower R-value on the bottom of the panel delays heat transfer from the 'cold side' and will allow the phase change materials to change back to the lower temperature (e.g., solid) phase during cooler time periods (e.g., at night) thus eliminating the peak heat load daily cycling that occurs with conventional insulation.

In one example embodiment, cover layer 28 comprises oriented strand board (OSB); substrate layer 26 comprises a closed-cell polyiso (e.g., polyisocyanurate) foam board (such as that marketed by Atlas Roofing Corporation as ACFoam-III®); and insulation layer 30 comprises a polyiso sheathing (such as that marketed by Atlas Roofing Corporation as Energy Shield®). The insulation layer 30 preferably has non-reflective trilaminate facers (foil-kraft-foil) on one side and a trilaminate or solid foil facer on an unprinted back side. It will be appreciated that the composition of the aforementioned layers can vary in differing embodiments.

FIG. 2A, FIG. 2B, and FIG. 2C illustrate a second example embodiment of a composite construction panel 20(2). The second example embodiment differs from the first example embodiment primarily in the shape of the phase change regions. Whereas in the first example embodiment the phase change regions have an essentially square shape, in the second example embodiment the phase change regions 40(2) have an essentially rectangular shape. A major dimension of the phase change regions 40(2) may extend essentially along the entire width of the composite construction panel 20(2) as shown, or only along a portion thereof. Moreover, one or more essentially rectangular phase change regions 40(2) may be aligned across the width dimension so that vent channels may be provided between minor dimensions of adjacent phase change regions 40(2). It should be appreciated that phase change regions 40 of other shapes, sizes, or configurations could also be utilized, such as an oval or triangular configuration, for example.

FIG. 3 illustrates a third example embodiment of a composite construction panel 20(3) which differs from either the first example embodiment or the second example embodiment primarily by further comprising a sub-substrate 50. The sub-substrate 50, situated beneath substrate layer 26, may comprise the same material as cover layer 28. For example, in an example implementation sub-substrate 50 may comprise oriented strand board (OSB).

Figure 4:
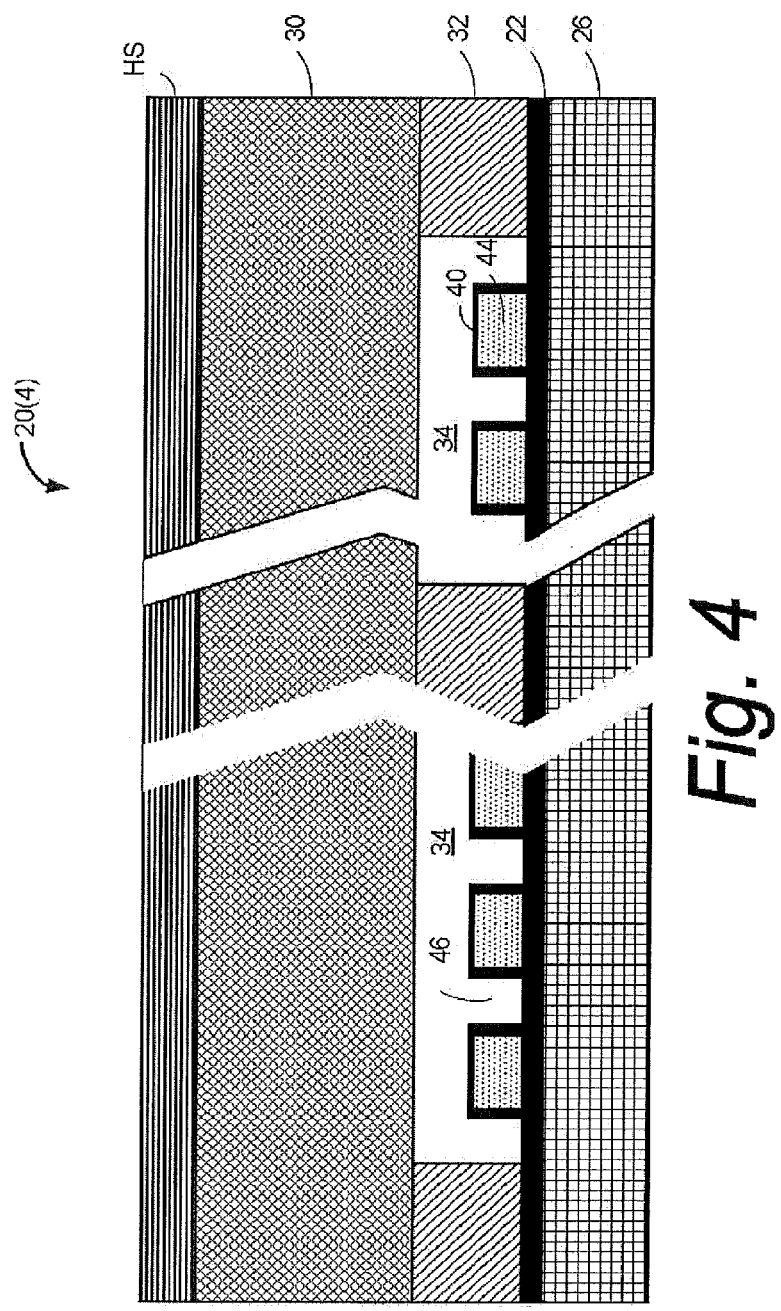
FIG. 4 is a sectioned side view of a composite panel according to a fourth example embodiment.
Figure 5:
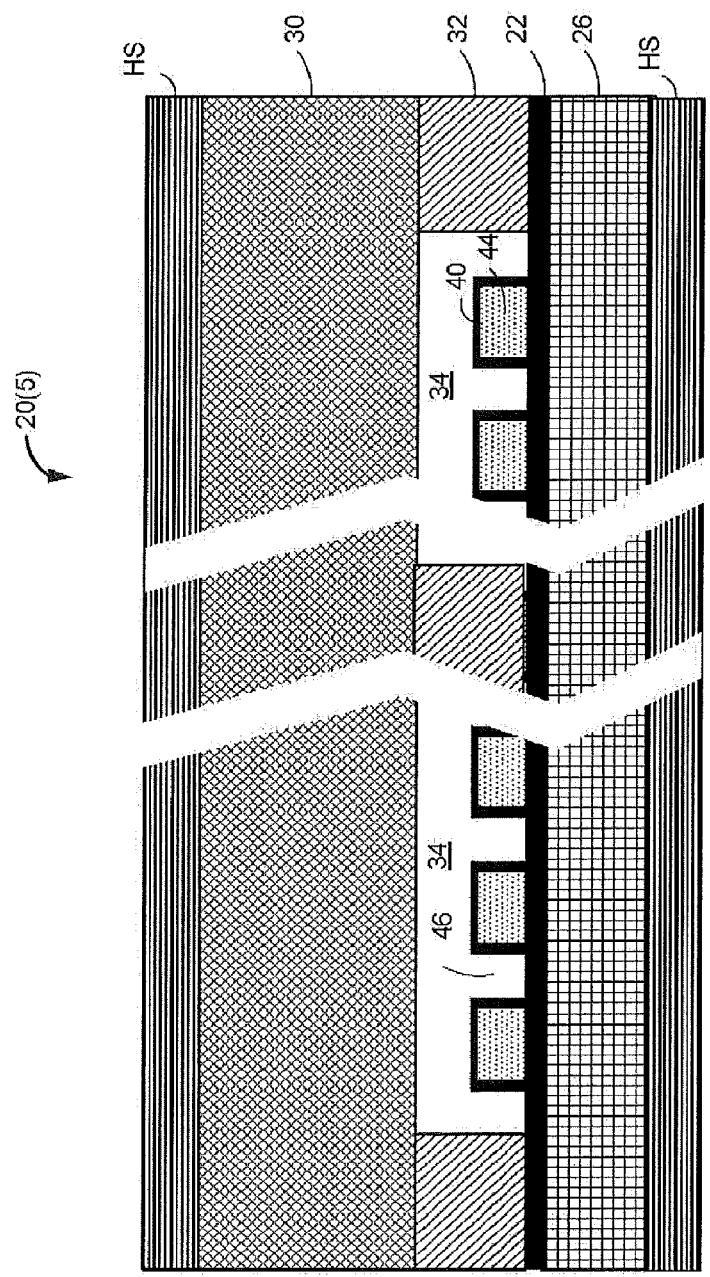
FIG. 5 is a sectioned side view of a composite panel according to a fifth example embodiment.

FIG. 4 illustrates a fourth example embodiment of composite construction panel 20(4) in which cover layer 28 comprises a polyiso organic plastic foam which requires few fasteners for installation, such as a board marketed by Atlas Roofing Corporation as ACFoam® HS CoverBoard. FIG. 5 illustrates a fifth example embodiment of composite construction panel 20(5) in which both cover layer 28 and sub-substrate 50 comprise the board marketed by Atlas Roofing Corporation as ACFoam® HS CoverBoard.

Figure 6:
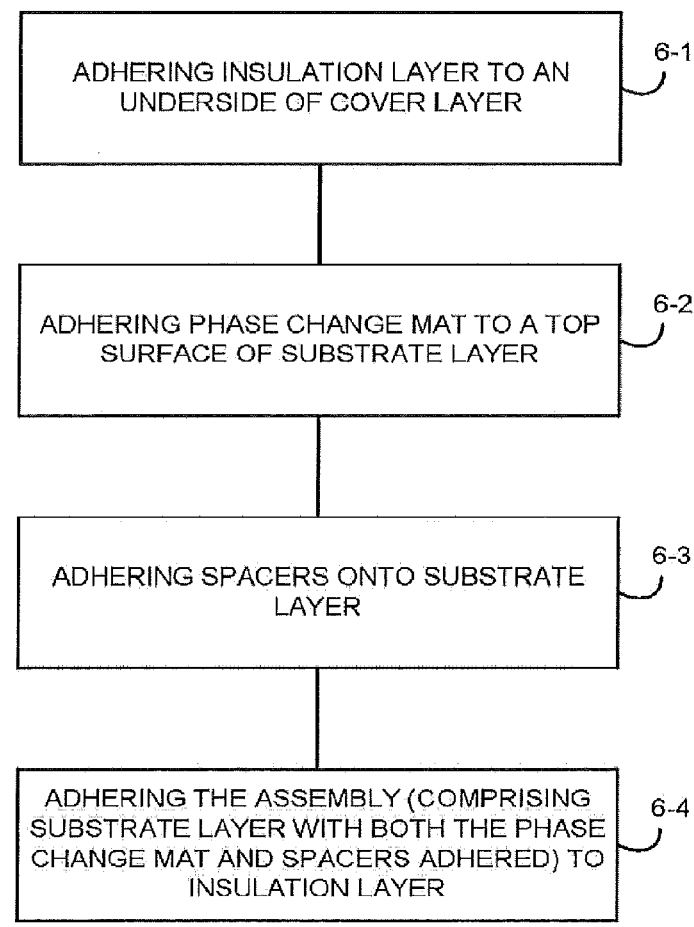
FIG. 6 is a flowchart showing example acts of steps included in an example method of fabricating certain embodiments of composite construction panels described herein.

An example method of fabricating the composite construction panel (e.g., of the first through fifth embodiments hereof) is shown in FIG. 6. Act 6-1 comprises adhering (e.g., gluing) insulation layer 30 to an underside of cover layer 28. Act 6-2 comprises adhering (e.g., laminating) phase change mat 22 to a top surface of substrate layer 26. Thereafter, as act 6-3 the spacers 32 (which serve as cross vent risers) are adhered (e.g., laminated) onto substrate layer 26. For example, spacers 32 may be adhered at the end edges and at 16 inches centered. Then, as act 6-4, the assembly comprising substrate layer 26 with both the phase change mat 22 and spacers 32 adhered thereto is laminated to an underside or bottom surface of insulation layer 30. In this arrangement, when the insulation layer 30 is a polyiso sheathing (such as Energy Shield®), the bottom surface is considered to be that which has the printed side. It should be noted that various layers can be coupled to one another either directly or indirectly, as described herein.

Figure 7:
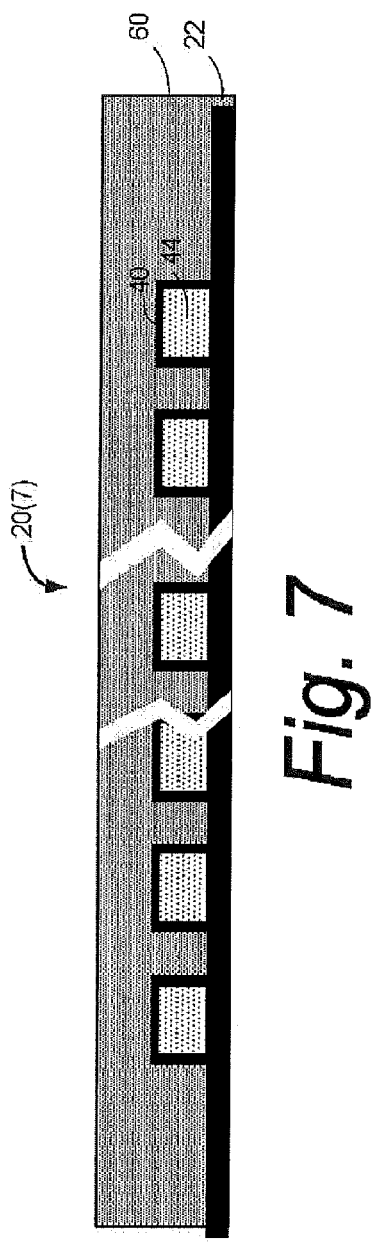
FIG. 7 is a sectioned side view of a composite panel according to another example embodiment.

FIG. 7 illustrates a sixth example embodiment of composite construction panel 20(7). In the composite construction panel 20(7), the phase change mat 22 has a cover layer of polyiso foam 60 poured or otherwise formed on top thereof. In the sixth example embodiment, the phase change regions 40 of phase change mat 22 are thus embedded in polyiso foam cover layer 60.

In the sixth example embodiment, as in other example embodiments, the phase change mat 22 does not necessarily have to be a one-piece mat. If desired, plural phase change mats 22 can be laid or positioned adjacent one another, either in the width or length direction, in order to achieve the essentially complete footprint of the respective embodiment of the composite construction panel.

Figure 9:
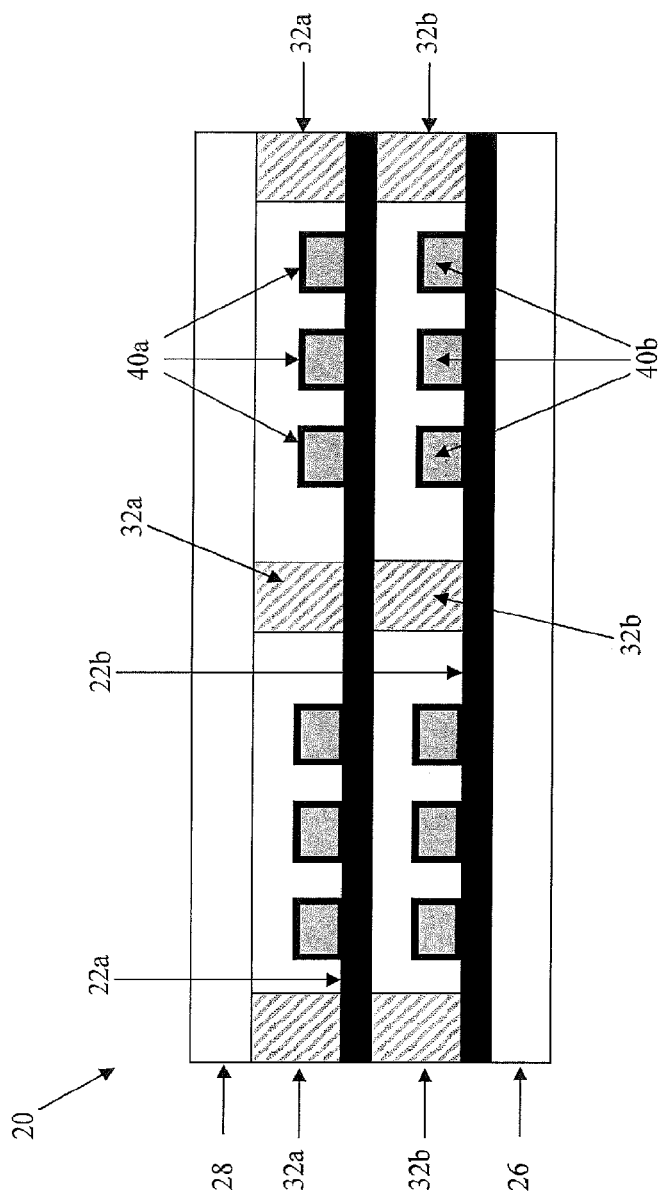
FIG. 9 is a sectioned side view of a composite panel according to another example embodiment.

FIG. 9 illustrates another example embodiment. In the embodiment of FIG. 9, a composite construction panel 20 comprises a substrate layer 26, a cover layer 28 over the substrate layer 26 and separated from the substrate layer 26 by one or more first spacers 32 a, and a plurality of mats 22 a and 22 b disposed between the substrate layer 26 and the cover layer 28, wherein the mats 22 a and 22 b are vertically separated from one another in a stacked configuration by one or more second spacers 32 b and comprise at least one phase change material disposed in at least one phase change region (40 a, 40 b). First mat 22 a comprises a first phase change material disposed in a first phase change region 40 a and second mat 22 b comprises a second phase change material disposed in a second phase change region 40 b, wherein the first and second phase change materials are differing phase change materials. The differing phase change materials, in some embodiments, have differing chemical compositions and/or thermal properties. For example, in some embodiments, a first PCM has a transition temperature above about 30° C. and a second PCM has a transition temperature below about 30° C. In some embodiments, the first PCM has a phase transition temperature between about 30° C. and about 50° C. or between about 30° C. and about 40° C., and the second PCM has a phase transition temperature between about 15° C. and about 29° C., between about 20° C. and about 29° C., or between about 20° C. and about 27° C. Therefore, in the embodiment of FIG. 9, the PCM of the mat 20 a closer to the cover layer 28 (which is generally disposed closer to the exterior of the building or building component) has a higher phase transition temperature than the PCM of the mat 20 b closer to the substrate layer 26 (which is generally disposed closer to the interior of the building). This arrangement of PCMs can permit efficient insulation operation of the composite construction panel 20. Other phase transition temperatures are also possible. In some embodiments, for instance, the first PCM has a phase transition temperature lower than the phase transition temperature of the second PCM. Any combination of phase transition temperatures not inconsistent with the objectives of the present invention may be used. Moreover, selection of PCM phase transition temperatures can be based on the building application and/or the average external temperature. Similarly, other design parameters can also be chosen based on the application. For example, for a ceiling or roof application, a composite construction panel described herein can comprise a thick foam cover layer, a first mat adjacent the cover layer comprising a first PCM having a phase transition temperature between about 30° C. and about 50° C., a thin foam substrate layer, and a second mat adjacent the substrate layer comprising a second PCM having a phase transition temperature between about 15° C. and about 29° C.

Figure 10:
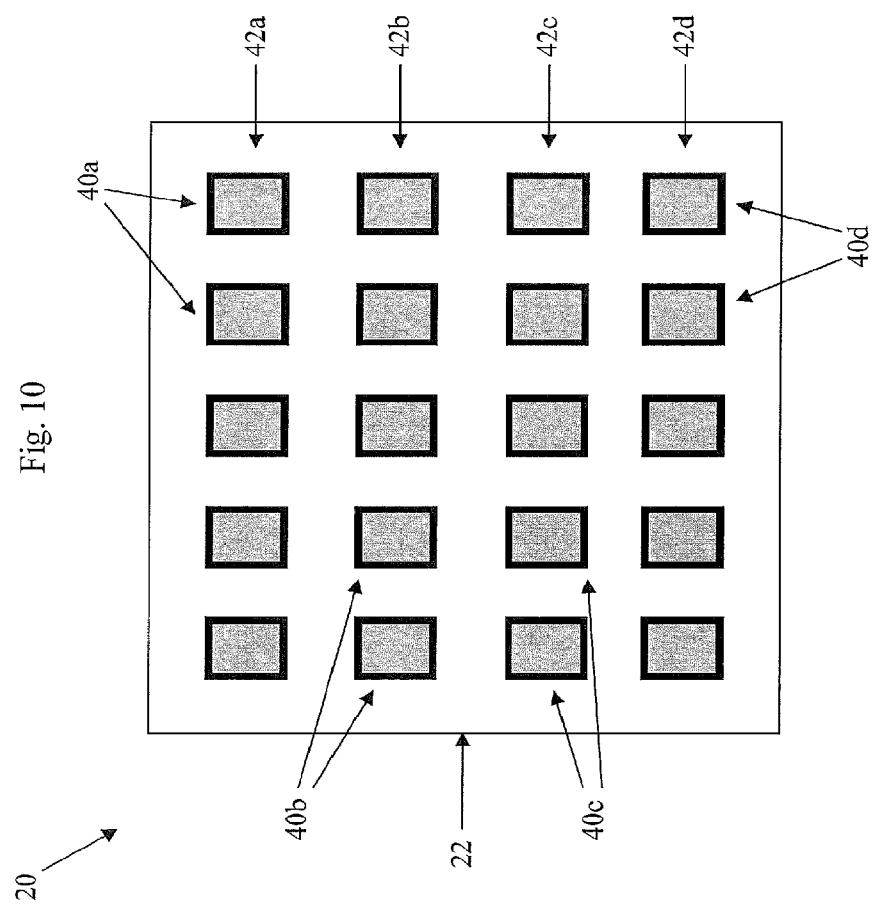
FIG. 10 is a top view of a composite panel according to another example embodiment.

FIG. 10 illustrates a top view of a composite panel according to another example embodiment. In the example embodiment of FIG. 10, a composite construction panel 20 comprises a substrate layer (not shown), a cover layer (not shown) over the substrate layer and separated from the substrate layer by one or more first spacers (not shown), and at least one mat 22 disposed between the substrate layer and the cover layer, wherein the mat comprises a plurality of phase change regions 40 $a$, 40 $b$, 40 $c$, and 40 $d$ arranged in a plurality of rows 42 $a$, 42 $b$, 42 $c$, and 42 $d$, respectively, wherein a first row (e.g., 42 $a$) comprises a first phase change material and a second row (e.g., 42 $b$) comprises a second phase change material, the first and second phase change materials being differing phase change materials. As described above, the differing phase change materials, in some embodiments, can have differing chemical compositions and/or differing thermal properties. In some embodiments, for instance, the first and second phase change materials have differing phase transition temperatures, including any combination of differing transition temperatures described above.

In addition, in the embodiment of FIG. 10, the plurality of rows forms a grid pattern of phase change regions. However, other arrangements of phase change regions are also possible. For example, in some embodiments, two or more mats are disposed between the substrate layer and the cover layer laterally (i.e., in the horizontal or xy-plane, as opposed to stacked vertically in the z-direction), so that each mat occupies only a portion of the overall footprint of the panel. The two or more mats can comprise differing identities or amounts of PCMs, so that the phase change properties such as the transition temperature of the phase change regions of the mats can be varied in the lateral or xy-plane in a "block" or "mat by mat" manner rather than in a "row by row" manner. The differing mats can also, in some embodiments, have differing footprints or dimensions in the xy-plane of the panel.

Combinations of differing PCMs having differing phase transition temperatures as described herein, in some embodiments, permit composite construction panels described herein to be used without coupling to an air handling system such as an HVAC system. In some embodiments described herein, it is not necessary to provide forced air flow in the vent spaces or cross vent channels of a composite panel described herein. Instead, in some embodiments, the combination of PCMs provides accelerated phase transitions without additional air flow. For instance, in some embodiments, a PCM having a higher phase transition temperature can help accelerate the freezing of a nearby PCM having a lower phase transition temperature. Moreover, in some embodiments, such synergies can be obtained without the use of forced air flows such as those provided by an HVAC system coupled to the composite construction panel.

Alternatively, in other embodiments, a composite construction panel described herein can be coupled to one or more air handling devices, such as one or more fans. The fans, in some embodiments, can be used to ventilate or provide air flow in the vent spaces and/or cross vent channels. Further, the one or more fans, in some embodiments, are wind-powered fans. In other embodiments, the one or more fans are solar-powered. Solar-powered fans, in some embodiments, can be coupled to one or more photovoltaic panels or solar cells disposed in or on a building wherein the composite construction panel is used, including on a roof of the building.

Moreover, in some embodiments, the vent spaces and/or cross vent channels of a composite construction panel described herein can be sealed. Sealed panels, in some embodiments, prevent or substantially prevent the air in the vent spaces and/or cross vent channels from exiting the panel. Therefore, in some embodiments, the air disposed in the vent spaces or channels can surround and be in thermal contact with the phase change regions and can serve as a heat sink, including a static heat sink.

It should be noted that the various components of composite construction panels described herein can be formed from any materials not inconsistent with the objectives of the present invention. Choice of materials, in some embodiments, can be based on the desired building application, such as exterior or interior use. In some embodiments, for example, one or both of the substrate layer and the cover layer is formed from a foam. Any foam not inconsistent with the objectives of the present invention may be used. In some embodiments, for instance, the foam comprises polyurethane or polyisocyanurate. In other embodiments, the foam comprises an ester foam, latex foam, neoprene foam, ethafoam, or polystyrene foam. A foam described herein can be a closed cell foam or an open cell foam.

Moreover, in some embodiments, one or more functional additives are disposed in the foam of a layer described herein. For example, in some embodiments, a fire retardant or extinguisher is disposed in the foam. Any fire retardant or extinguisher not inconsistent with the objectives of the present invention may be used. In some embodiments, a fire retardant or extinguisher can comprise an organic composition or an inorganic composition. In some embodiments, a fire retardant or extinguisher comprises tris(2-chloro-1-(chloromethyl)ethyl)phosphate. In some embodiments, a fire retardant or extinguisher comprises aluminum hydroxide and/or magnesium hydroxide. In some embodiments, a fire retardant or extinguisher comprises a salt hydrate or a zeolite, including a natural or synthetic zeolite.

In other embodiments, a PCM is disposed in the foam of a layer described herein. Any PCM not inconsistent with the objectives of the present invention may be used. In some embodiments, the PCM disposed in a foam described herein differs from a PCM disposed in another component of the composite panel, such as a phase change mat. In other embodiments, the PCM of a foam is the same type of PCM as another PCM of the composite panel. Thus, in some embodiments, the transition temperature of the PCM of a foam can be the same or substantially the same as the transition temperature of a PCM of a mat of the panel. Alternatively, in other embodiments, the transition temperature of the foam PCM is relatively high (e.g., above about 30° C. or 50° C.) if the foam forms a cover layer of the panel, or relatively low (e.g., below about 30° C. or 27° C.) if the foam forms a substrate layer of the panel.

Various layers of composite panels described herein can also be formed from materials other than foams. For example, in some embodiments, one or both of the substrate layer and the cover layer is formed from wood, plywood, particle board, or oriented strand board. In some embodiments, one or both of the substrate layer and the cover layer is formed from gypsum board. In some embodiments, one or both of the substrate layer and the cover layer is formed from metal, such as aluminum. Again, in some embodiments, the choice of material can be based on the desired application of the composite construction panel. For example, panels for use in ceilings or walls, in some embodiments, can comprise a foam cover layer and a gypsum board substrate layer, with one or more phase change mats disposed in between, as described herein. Alternatively, in other embodiments, a composite panel for use in ceilings can comprise a foam cover layer and a ceiling tile substrate layer, with one or more phase change mats disposed in between. For roofing applications, a composite panel described herein, in some embodiments, can comprise a wood or metal cover layer and a foam substrate layer, with one or more phase change mats disposed in between.

Moreover, the spacers of a composite panel described herein can have any construction not inconsistent with the objectives of the present invention. In some embodiments, a spacer is hollow. Further, in some embodiments comprising a hollow spacer, one or more additives can be disposed in the interior of the hollow spacer. For example, in some embodiments, a fire retardant or extinguisher is disposed in the interior of the hollow spacer, including a fire retardant or extinguisher described hereinabove. In other embodiments, a PCM is disposed in the interior of the hollow spacer. The PCM of a spacer, in some embodiments, has a higher transition temperature than a PCM of a phase change mat of the panel. With this arrangement, in some embodiments, the PCM of the spacer can absorb some of the thermal energy in the vent space, thereby facilitating the freezing (or other phase transition) of a PCM having a lower phase transition temperature.

It should be understood that features of one or more of the example embodiments described herein may be included in or combined with features of other example embodiments. For example, either the square shape of the phase change regions 40 of the first example embodiment or the rectangular shape of the second example embodiment may be utilized in any of the subsequently described embodiments or even other embodiments encompassed hereby. Moreover, any feature or characteristic not particularly described with reference to a certain embodiment may be understood from other example embodiments.

Figure 8:
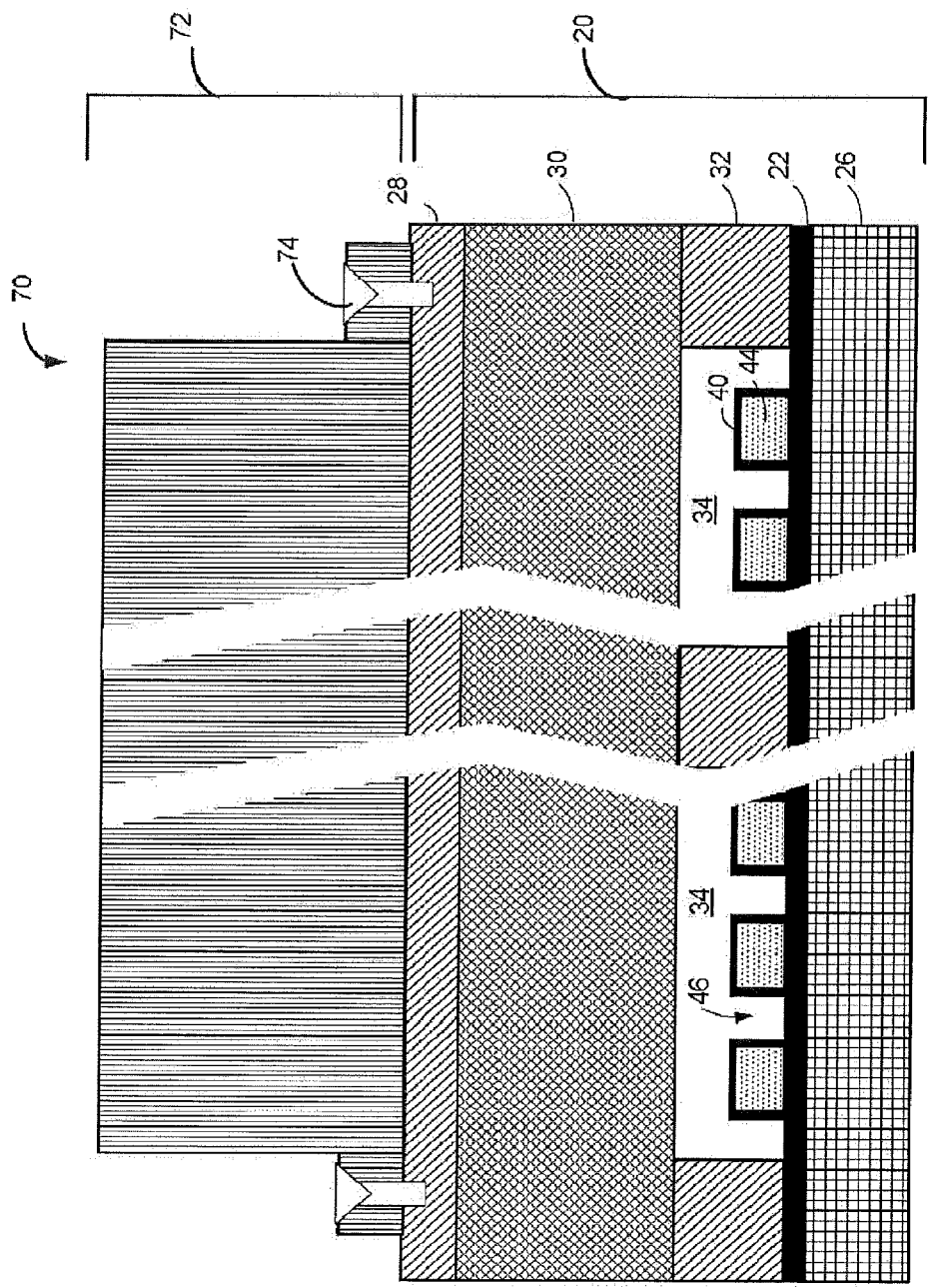
FIG. 8 is a sectioned side view showing an energy-harnessing assembly which comprises an energy-harnessing body mounted on or integrally formed with a composite construction panel according to any of the embodiments described herein.

FIG. 8 illustrates an energy-harnessing building module or assembly 70 which illustrates in example, representative fashion the use or incorporation of a composite construction panel 20 according to any of the example embodiments of composite construction panels described herein. For sake of convenience FIG. 8 happens to depict incorporation of the composite construction panel 20 of FIG. 1A, but it should be understood that the energy-harnessing assembly 70 may include any other or even a combination of embodiments encompassed hereby, including the composite construction panel 20(7) of FIG. 7. The energy-harnessing assembly 70 is shown as comprising an energy-harnessing body 72 which is mounted onto composite construction panel 20. In the particular example embodiment shown in FIG. 8, energy-harnessing building body 72 is secured to composite construction panel 20 through fasteners 74. It should be understood that other means of attachment may instead be provided, such (by way of non-limiting example) as means for adhering energy-harnessing body 72 to composite construction panel 20, or interlocking energy-harnessing body 72 onto composite construction panel 20.

The energy-harnessing body 72 may comprise any suitable energy-harnessing structure, such as a solar cell, a photovoltaic cell, or any other module or structure which converts radiant or thermal energy into electrical current or voltage. The energy-harnessing building body 72 may also, in addition to or instead of collecting energy, collect and channel precipitation or other fluids.

The energy-harnessing body 72 may take the shape or configuration of a panel, a module, or a shingle. Each energy-harnessing building assembly 70 may host or have mounted thereon one or more energy-harnessing bodies 72, e.g., plural modules, panels, or shingles (e.g., photovoltaic shingles).

For one or more of the embodiments described herein or encompassed hereby, the phase change material 44 may take any suitable form of known phase change materials, and thus in at least one of its phases may be in a granular or powder form, a gel, or a liquid. An example phase change mat 22 suitable for use in any of the example embodiments described herein is a mat marketed by Phase Change Energy Solutions, Asheboro, N.C., USA, as BioPCM™ or ThermaMat™. The phase change material 44 included in such phase change mat 22 may be a solid or a gel above or below a transition temperature. In some embodiments, a phase change material described herein comprises a paraffin, wax, salt hydrate, fatty acid, derivative of a fatty acid, fatty alcohol, ester, or mixture thereof. In some embodiments, emulsifiers, thickening agents, cross linkers, fire retardants and/or extinguishers are added as components of a PCM. In some implementations, the phase change component of the phase change material 44 has a gel physical state at 27° C., a density in a range of 0.8 to 0.9; and a boiling point above 249° C. The phase change mat 22 may also have a fire suppression component and a film component. The film component may be, e.g., a multilayer film having thickness of, for example, 0.020 inches, and may be of the thermoplastic olefin polymer family. For example, in an example implementation the film component may comprise a blend of low and high density polyethylene (CAS: 9002-88-4); linear low density polyethylene (CAS: 2521302-9); and nylon 6 (CAS: 25038-54-4). For an example, non-limiting implementation additives for the film component may include up to 0.03% by weight of amorphous silica (CAS: 60676-86-0); calcium carbonate (CAS: 471-34-1); cristobalite (CAS: 14464-46-1); crystalline silica (CAS: 15468-32-3); Erucyl amide (CAS: 112-84-5); and flux-calcined diatomaccous earth (CAS: 68855-54-9). The silica, cristobalite, diatomaceous earth and carbon black additives may be encapsulated in the thermoplastic resin.

In some example embodiments the phase change mat 22 may also be fabricated in accordance with or understood from U.S. patent application Ser. No. 12/448,001, filed Jan. 17, 2001, and published as U.S. Patent Publication No. 2010/0127000, which is incorporated herein by reference in its entirety.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

That which is claimed is:

1. A method of making a composite construction panel, the method comprising:
adhering a first mat to a top surface of a substrate layer, the first mat comprising at least one first phase change material disposed in at least one first phase change region;
adhering one or more first spacers to the top surface of the substrate layer; and
adhering a cover to the one or more first spacers,
wherein the first mat and the one or more first spacers are separate components;
wherein the cover is separated from the substrate layer by at least the one or more first spacers;
disposing a second mat between the first mat and the cover, the second mat comprising at least one second phase change material disposed in at least one second phase change region;
disposing one or more second spacers between the second mat and the cover;
the first mat and the second mat are vertically separated from one another in a stacked configuration by the one or more second spacers; and
wherein the first and second phase change materials are differing phase change materials.

2. The method of claim 1, wherein:
the one or more first spacers define one or more first spaces, cross channels, or both.

3. The method of claim 1, wherein:
the one or more second spacers define one or more second spaces, cross channels, or both.

4. The method of claim 3, wherein at least one spacer is hollow and one or more salt hydrates is disposed in the interior of the hollow spacer.

5. The method of claim 3, wherein the one or more first or second spaces, cross channels, or both are sealed.

6. The method of claim 3, wherein the panel is coupled to one or more fans operable to ventilate or provide air flow in the one or more first and/or second spaces, cross channels, or both.

7. The method of claim 1, wherein the first phase change material has a transition temperature below 30° C.; and the second phase change material has a transition temperature above 30° C.

8. The method of claim 1, wherein one or both of the substrate layer and the cover is formed from a foam.

9. The method of claim 8, wherein the foam comprises polyurethane or polyisocyanurate.

10. The method of claim 8, wherein a fire retardant or extinguisher is disposed in the foam.

11. The method of claim 8, wherein a phase change material is disposed in the foam.

12. The method of claim 1, wherein one or both of the substrate layer and the cover is formed from wood, plywood, particle board, or oriented strand board.

13. The method of claim 1, wherein one or both of the substrate layer and the cover is formed from gypsum board.

14. The method of claim 1, wherein one or both of the substrate layer and the cover is formed from metal.

15. The method of claim 1, wherein at least one of the first mat or the second mat comprises a plurality of phase change regions arranged in a plurality of rows, the rows comprising differing phase change materials.

* * * * *